(12) United States Patent
Walker

(10) Patent No.: US 11,366,762 B2
(45) Date of Patent: Jun. 21, 2022

(54) CACHE FILTER

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 16/542,892

(22) Filed: Aug. 16, 2019

(65) Prior Publication Data

US 2019/0370181 A1    Dec. 5, 2019

Related U.S. Application Data

(63) Continuation of application No. 15/668,016, filed on Aug. 3, 2017, now Pat. No. 10,402,337.

(51) Int. Cl.
*G06F 12/08* (2016.01)
*G06F 12/0888* (2016.01)
*G06F 12/121* (2016.01)
*G06F 12/0871* (2016.01)

(52) U.S. Cl.
CPC ...... *G06F 12/0888* (2013.01); *G06F 12/0871* (2013.01); *G06F 12/121* (2013.01); *G06F 2212/1024* (2013.01); *G06F 2212/214* (2013.01); *G06F 2212/461* (2013.01); *G06F 2212/466* (2013.01); *G06F 2212/603* (2013.01)

(58) Field of Classification Search
CPC .. G06F 12/12; G06F 12/0802; G06F 12/0888; G06F 2212/50; G06F 2212/507
See application file for complete search history.

(56) References Cited

U.S. PATENT DOCUMENTS

| | | | |
|---|---|---|---|
| 5,058,006 | A | 10/1991 | Durdan |
| 6,560,675 | B1 | 5/2003 | Aho |
| 6,880,044 | B2 | 4/2005 | David |
| 7,685,372 | B1 | 3/2010 | Chen |
| 8,041,922 | B2 | 10/2011 | Greiner |
| 8,347,034 | B1 | 1/2013 | Chen |
| 9,684,601 | B2 | 6/2017 | Bottcher |
| 2002/0069333 | A1 | 6/2002 | Ghosh |
| 2002/0087795 | A1 | 7/2002 | Hum |

(Continued)

FOREIGN PATENT DOCUMENTS

EP    2622485 B1    10/2016

OTHER PUBLICATIONS

Jih-Kwon Peir, Shih-Chang Lai, Shih-Lien Lu, Jared Stark, Konrad Lai, "Bloom filtering cache misses for accurate data speculation and prefetching", ICS '02: Proceedings of the 16th international conference on Supercomputing, Jun. 2002 pp. 189-198 (Year: 2002).*

(Continued)

*Primary Examiner* — Khoa D Doan
(74) *Attorney, Agent, or Firm* — Brooks, Cameron & Huebsch, PLLC

(57) ABSTRACT

The present disclosure includes apparatuses and methods related to a memory system including a filter. An example apparatus can include a filter to store a number flags, wherein each of the number of flags corresponds to a cache entry and each of the number of flags identifies a portion of the memory device where data of a corresponding cache entry is stored in the memory device.

20 Claims, 4 Drawing Sheets

(56) References Cited

U.S. PATENT DOCUMENTS

| | | |
|---|---|---|
| 2002/0112132 A1 | 8/2002 | Lesmanne |
| 2002/0124143 A1 | 9/2002 | Barroso |
| 2002/0143799 A1 | 10/2002 | Jourdan |
| 2002/0184221 A1 | 12/2002 | Ahmad |
| 2004/0148464 A1 | 7/2004 | Jang |
| 2006/0112233 A1 | 5/2006 | Hu |
| 2007/0055826 A1 | 3/2007 | Morton |
| 2007/0143546 A1 | 6/2007 | Narad |
| 2008/0104324 A1 | 5/2008 | Raghuvanshi |
| 2008/0155229 A1 | 6/2008 | Beyer |
| 2008/0209133 A1 | 8/2008 | Ozer |
| 2008/0250213 A1 | 10/2008 | Holt |
| 2009/0083495 A1 | 3/2009 | Khellah |
| 2009/0300293 A1* | 12/2009 | Mantor ............... G06F 12/0817 711/141 |
| 2009/0327612 A1 | 12/2009 | Nicholas |
| 2010/0274960 A1 | 10/2010 | Lee |
| 2010/0274980 A1 | 10/2010 | Stringham |
| 2010/0281220 A1 | 11/2010 | Cantin |
| 2010/0281221 A1 | 11/2010 | Cantin |
| 2013/0036271 A1 | 2/2013 | Krishna |
| 2013/0042078 A1 | 2/2013 | Jalal et al. |
| 2013/0138894 A1 | 5/2013 | Loh |
| 2013/0166816 A1 | 6/2013 | Atkisson et al. |
| 2014/0019691 A1 | 1/2014 | Dally |
| 2014/0040561 A1 | 2/2014 | Lih et al. |
| 2014/0173244 A1 | 6/2014 | Thompson |
| 2014/0289467 A1 | 9/2014 | Svendsen |
| 2014/0372700 A1 | 12/2014 | Whalley |
| 2015/0127767 A1 | 5/2015 | Gheith et al. |
| 2015/0220573 A1 | 8/2015 | Attalur et al. |
| 2015/0378919 A1 | 12/2015 | Anantaraman et al. |
| 2016/0070651 A1 | 3/2016 | Shwartsman et al. |
| 2016/0188486 A1 | 6/2016 | Sohi |
| 2016/0259689 A1 | 9/2016 | Mukherjee |
| 2017/0097909 A1 | 4/2017 | Simionescu et al. |
| 2017/0132147 A1 | 5/2017 | Loh |
| 2017/0192900 A1 | 7/2017 | Persson |
| 2017/0322885 A1 | 11/2017 | Mukherjee |
| 2018/0004668 A1 | 1/2018 | Azizi |
| 2018/0232310 A1 | 8/2018 | Chang |
| 2018/0232313 A1 | 8/2018 | Nikoleris |
| 2018/0285267 A1 | 10/2018 | Sasanka |

OTHER PUBLICATIONS

Bruce Jacob, David T. Wang, and Spencer Ng, Memory Systems: Cache, DRAM, Disk. (Year: 2008).*

Margaret Rouse, Cache Memory, May 2015 (Year: 2015).*

J. Tao, D. Hillenbrand, L. Wang and H. Marten, "Studying Filter Cache Bypassing on Embedded Systems," 2010 10th IEEE International Conference on Computer and Information Technology, 2010, pp. 1679-1686, doi: 10.1109/CIT.2010.296. (Year: 2010).*

Decision of the Intellectual Property Office from related Taiwan Application No. 107126262, dated Aug. 30, 2019, 13 pages.

International Search Report and Written Opinion from related international application No. PCT/US2018/044726, dated Nov. 26, 2018, 15 pages.

Office Action from related Taiwanese patent application No. 107126262, dated Mar. 21, 2019, 19 pages.

Office Action from related Taiwanese patent application No. 108140405, dated Dec. 14, 2020, 17 pages.

Search Report from related European patent application No. 18841489.0, dated Mar. 10, 2021, 8 pages.

Second Office Action from related Taiwan Patent Application No. 108140405, dated Aug. 24, 2021, 10 pages.

Preliminary Rejection from related Korean Patent Application No. 10-2020-7005812, dated Aug. 26, 2021, 10 pages.

* cited by examiner

CACHE FILTER

PRIORITY INFORMATION

This application is a Continuation of U.S. application Ser. No. 15/668,016, filed on Aug. 3, 2017, the contents of which are incorporated herein by reference.

TECHNICAL FIELD

The present disclosure relates generally to memory systems, and more particularly, to apparatuses and methods with memory system having a filter.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

A memory system can include a cache memory that may be smaller and/or faster than other memory of the system (e.g., DRAM, NAND, disk storage, solid state drives (SSD), etc., which may be referred to as main memory). As an example, cache memory may comprise DRAM memory. A memory system can cache data to improve performance of the memory system. Therefore providing cache memory that delivers improved performance for the memory system is desirable. Improving the latency and hit rate of the cache memory are performance characteristics that can provide improved performance of the memory system.

DETAILED DESCRIPTION

Figure 1:
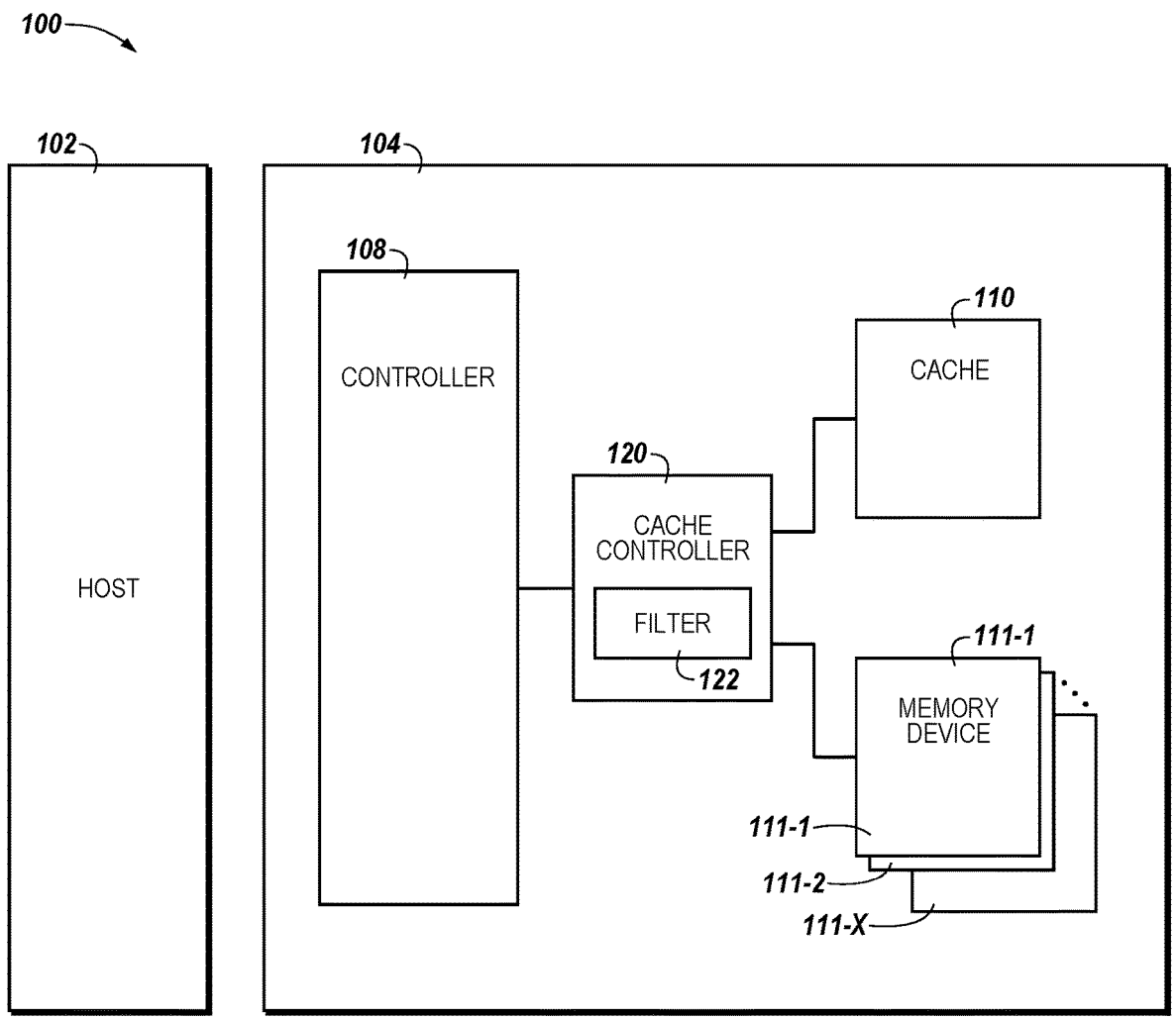
FIG. 1 is a block diagram of a computing system including an apparatus in the form of a host and an apparatus in the form of memory system in accordance with one or more embodiments of the present disclosure.

The present disclosure includes apparatuses and methods related to a memory system including a filter. An example apparatus can include a filter to store a number flags, wherein each of the number of flags corresponds to a cache entry and each of the number of flags identifies a portion of the memory device where data of a corresponding cache entry is stored in the memory device.

In a number of embodiments, a filter on a cache and/or cache controller can be used to predict whether the cache controller should service a request to read and/or write data to a memory system using the cache memory and/or a memory device (e.g., backing store). For example, a filter can include a number of flags, where each of the number of flags can have a corresponding cache entry (e.g. cache line) in the cache memory and identify a portion of a memory device where data of a corresponding cache entry is stored in the memory device. The cache controller can use information from a request and the flags in the filter to determine whether the request may be serviced using data in the cache or whether the request is be serviced using data in the memory device.

In a number of embodiments, the flags can include a number of bits that identify a portion of a memory device where data of a corresponding cache entry is stored in the memory device. The number of bits can also indicate if data of a corresponding cache entry is valid or invalid and/or dirty or not dirty. For example, a memory device can include 16 regions of a particular size and a cache can be the size of one of the regions of the memory device. A filter can include a first bit that can be used to predict whether data of a corresponding cache entry is in a first portion of the memory device, the first 8 regions of the memory device in this example, or in a second portion of the memory device, the last 8 regions of the memory device in this example. A filter can include a first bit and a second bit that can be used to predict whether data of a corresponding cache entry is in a first portion of the memory device which corresponds to the first 4 regions of the memory device in this example, in a second portion of the memory device which corresponds to the second 4 regions of the memory device in this example, in a third portion of the memory device which corresponds to the third 4 regions of the memory device in this example, or in a fourth portion of the memory device which corresponds to the last 4 regions of the memory device in this example. The filter can also include a bit that indicates whether the data in an associated cache entry is valid or invalid and a bit that indicates whether data in an associated cache entry is dirty or not dirty.

A cache controller can receive a request with information, such as address information. The information in the request can indicate which flag in the filter is associated with the request, which cache entry in the cache is associated with request, and where data associated with the request is and/or will be located in a memory device. The cache controller can locate the flag associated with request and compare the information about where data associated with the request is and/or will be located in a memory device to the bits (e.g. settings) in the flag that identifies a portion of the memory device where data of a corresponding cache entry is stored in the memory device. If the location where data associated with the request is and/or will be located in a memory device is in the portion of the memory device where data of a corresponding cache entry is stored in the memory device as identified by the flag, then the cache controller can attempt to service the request using cache by querying the cache to determine if the data associated with the request is located in the cache. If the location where data associated with the request is and/or will be located in a memory device is not in the portion of the memory device where data of a corresponding cache entry is stored in the memory device as identified by the flag, then the cache controller can service the request using the memory device.

In a number of embodiments, a filter can be used to reduce latency of a memory system with cache by determining whether or not to attempt to service a request for data using a cache. The filter can indicate whether there is no chance or a chance that the request can be services using data in the cache. If the filter indicates that the request will be a cache miss, the cache controller can skip attempting to service the request with data that is in the cache (e.g., skip searching the cache for data associated with the request), thus decreasing the latency associated with the request and reducing the load on the cache.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M", "N", and "X", particularly with respect to reference numerals in the drawings, indicates that a number of the particular feature so designated can be included. As used herein, "a number of" a particular thing can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. As will be appreciated, elements shown in the various embodiments herein can be added, exchanged, and/or eliminated so as to provide a number of additional embodiments of the present disclosure.

FIG. 1 is a functional block diagram of a computing system 100 including an apparatus in the form of a host 102 and an apparatus in the form of memory system 104, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory system 104 can include a controller 108, a cache controller 120, cache 110, and a number of memory devices 111-1, . . . , 111-X. The cache 120 and/or memory devices 111-1, . . . , 111-X can include volatile memory and/or non-volatile memory.

As illustrated in FIG. 1, host 102 can be coupled to the memory system 104. In a number of embodiments, memory system 104 can be coupled to host 102 via a channel. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 can includes a host controller to communicate with memory system 104. The host 102 can send commands to the memory system 104 via a channel. The host 102 can communicate with memory system 104 and/or the controller 108 on memory system 104 to read, write, and erase data, among other operations. A physical host interface can provide an interface for passing control, address, data, and other signals between the memory system 104 and host 102 having compatible receptors for the physical host interface. The signals can be communicated between host 102 and memory system 104 on a number of buses, such as a data bus and/or an address bus, for example, via channels.

Controller 108, a host controller, a controller on cache 110, and/or a controller on cache memory can include control circuitry, e.g., hardware, firmware, and/or software. In one or more embodiments, controller 108, a host controller, a controller on cache 110, and/or a controller on cache memory can be an application specific integrated circuit (ASIC) coupled to a printed circuit board including a physical interface. Memory system 104 can include cache controller 120 and cache 110. Cache controller 120 and cache 110 can be used to buffer and/or cache data that is used during execution of read commands and/or write commands.

Cache controller 120 can include a buffer with filter 122. A buffer can include a number of arrays of volatile memory (e.g., SRAM) that can act as filter 122. A buffer on the cache controller can be configured to store signals, address signals (e.g., read and/or write commands), and/or data (e.g., metadata and/or write data). The buffer can temporarily store signals and/or data while commands are executed. Cache 110 can include arrays of memory cells (e.g., DRAM memory cells) that are used as cache and can be configured to store data that is also stored in a memory device. The data stored in cache and in the memory device is addressed by the controller and can be located in cache and/or the memory device during execution of a command.

Memory devices 111-1, . . . , 111-X can provide main memory for the memory system or could be used as additional memory or storage throughout the memory system 104. Each memory device 111-1, . . . , 111-X can include one or more arrays of memory cells, e.g., non-volatile and/or volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory devices 111-1, . . . , 111-X. It will be appreciated by those skilled in the art that the number of address input connections can depend on the density and architecture of the memory devices 111-1, . . . , 111-X.

Figure 2:
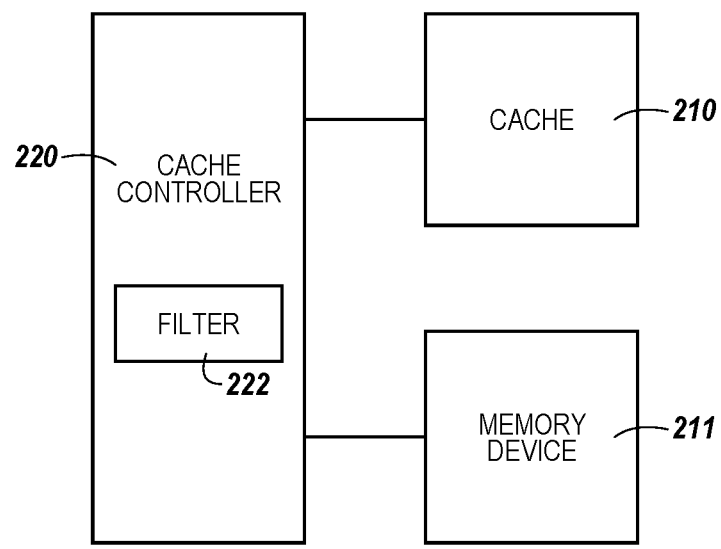
FIG. 2 is a block diagram of an apparatus in the form of a memory system in accordance with a number of embodiments of the present disclosure.

FIG. 2 is a block diagram of an apparatus in the form of a memory system in accordance with a number of embodiments of the present disclosure. In FIG. 2, the memory system can be configured to cache data and service requests from a host and/or memory system controller. The memory system can include cache controller 220 with a buffer including filter 222. The buffer can include SRAM memory, for example. A buffer can include information about the data in cache 210, including metadata and/or address information for the data in the cache. The memory system can include a memory device 211 coupled to the cache controller 220. Memory device 211 can include non-volatile memory arrays and/or volatile memory arrays and can serve as the backing store for the memory system.

Memory device 211 can include a controller and/or control circuitry (e.g., hardware, firmware, and/or software) which can be used to execute commands on the memory device 211. The control circuitry can receive commands from a memory system controller and or cache controller 220. The control circuitry can be configured to execute commands to read and/or write data in the memory device 211.

Figure 3:
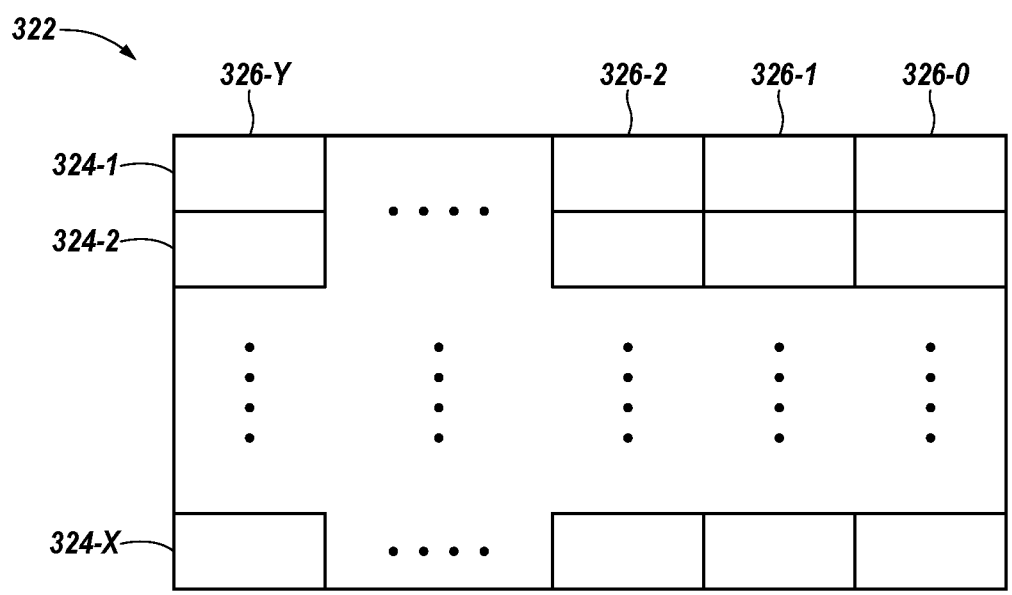
FIG. 3 is a block diagram of an apparatus in the form of a cache controller including a filter in accordance with a number of embodiments of the present disclosure.

FIG. 3 is a block diagram of an apparatus in the form of a cache controller including a filter in accordance with a number of embodiments of the present disclosure. In FIG. 3, filter 322 can be included on a cache controller, such as cache controller 120 in FIG. 1, for example. Filter 322 can include a number of entries (e.g., flags 324-1, ..., 324-X). Each of the flags 324-1, ..., 324-X can correspond to entries (e.g., cache lines) in a cache, such as cache 110 in FIG. 1. For example, flag 324-1 in filter 322 can correspond to a first entry in a cache, flag 324-2 in filter 322 can correspond to a second entry in a cache, flag 324-X in filter 322 can correspond to an Xth entry in a cache, and so on. Each of the flags 324-1, ..., 324-X can include number of bits 326-0, ..., 236-Y.

In a number of embodiments, the number of bits 326-0, ..., 236-Y in a flag can identify a portion of a memory device, such as memory 111 in FIG. 1, where data of a corresponding cache entry is stored in the memory device. A cache controller can receive a request and locate a flag in filter 322 based on information in the request. The request can include address information that can identify a flag in the filter 322 and also a cache entry in the cache, such as cache 110 in Figure, where data associated with the request may be located. The cache controller can locate the flag identified by the request and determine if the number of bits of the flag identify a portion of a memory device where data of a corresponding cache entry is stored in the memory device.

If the address information of the request includes an address for a portion of a memory device where the data of a corresponding cache entry is stored in the memory device as indicated by the number of bits of the flag, then the cache controller can check in the corresponding cache entry in the cache for the data associated with the request. The flag can be used by the cache controller to determine whether to check the cache for data associated with the request. The flag can indicate and/or predict that the data associated with the request may be located in the cache and the cache controller can proceed to check the cache to determine if the data associated with the request is a hit or miss in the cache. If the address information of the request does not include an address for a portion of a memory device where data of a corresponding cache entry is stored in the memory device as indicated by the number of bits of the flag, then the cache controller can retrieve the data associated with the request from the memory device.

Figure 4:
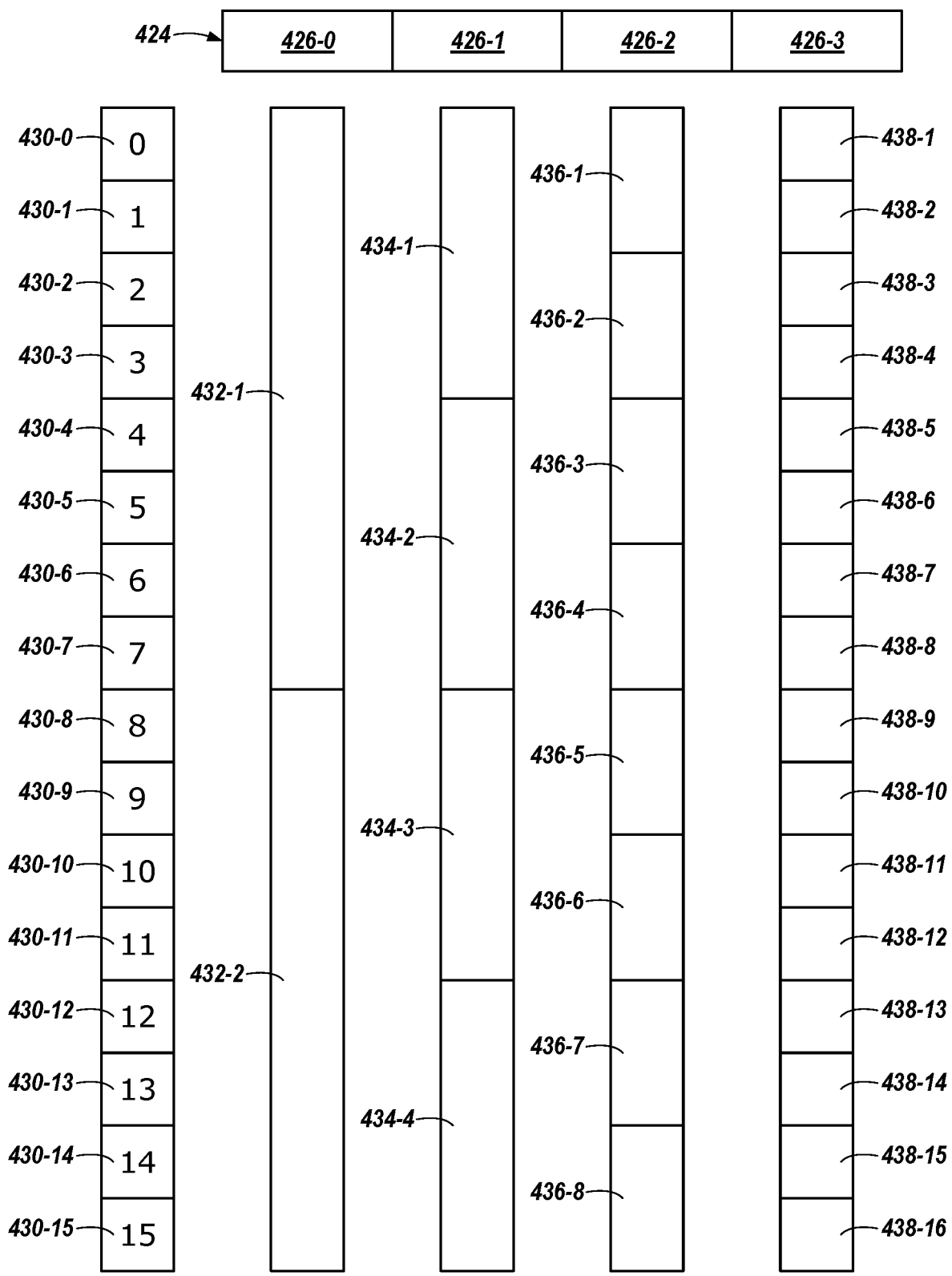
FIGS. 4-5 are diagrams illustrating a flag in a filter of cache controller in accordance with a number of embodiments of the present disclosure.
Figure 5:
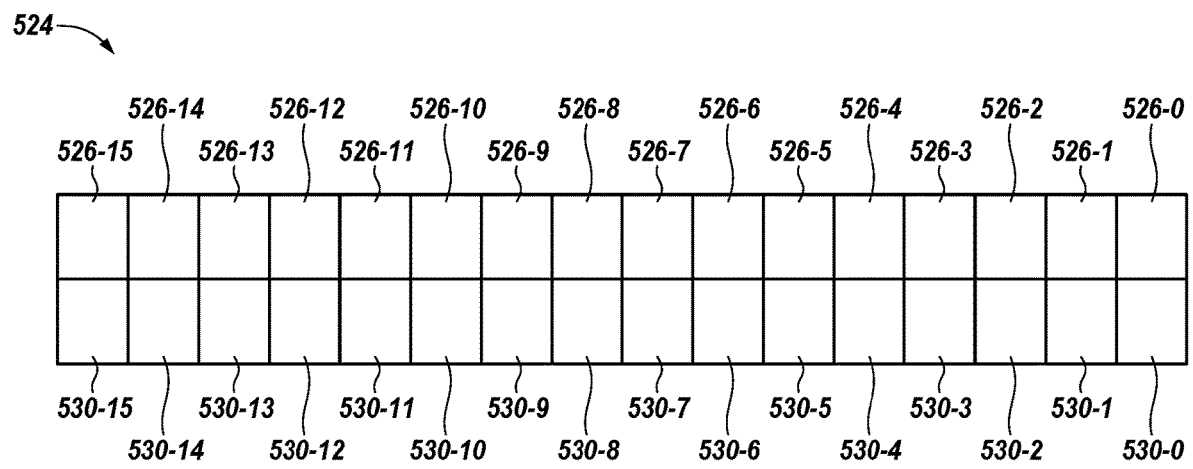

FIGS. 4-5 are diagrams illustrating a flag in a filter of cache controller in accordance with a number of embodiments of the present disclosure. In FIG. 4, flag 424 can be on a filter on a cache controller and correspond to an entry (e.g., cache line) of a cache. Flag 424 can be used to determine if data associated with a request may be in cache or if it is not in cache. In FIG. 4, flag 424 can include bits 426-0, 426-1, 426-2, and 426-3. In a number of embodiments, flag 424 can include any number of bits. The bits can correspond to at least a portion of an address where data in a corresponding cache entry is stored in a memory device. The cache controller can determine if data associated with a request may be located in a corresponding cache entry by comparing the address information in the request to the bits in the flag. If there is a match between the address information in the request and the bits in the flag, the cache controller can check the cache to determine if the data associated with the request is in the cache. If there is not a match between the address information in the request and the bits in the flag, the cache controller can locate and/or retrieve the data associated with the request from a memory device.

In a number of embodiments, bits 426-0, 426-1, 426-2, and 426-3 of flag 324 can be set to logical values 1 or 0, where a logical value of 0 indicates data in a corresponding cache entry is in a first portion of a memory device and a logical value of 1 indicates data in a corresponding cache entry is in a second portion of a memory device.

In a number of embodiments, flag 424 can include one bit, bit 426-0. When bit 426-0 is set to logical value 0, flag 424 can indicate data in a corresponding cache entry is in portion 432-1 of a memory device that includes is regions 430-0, ..., 430-7 of a memory device. When bit 426-0 is set to logical value 1, flag 424 can indicate data in a corresponding cache entry is in portion 432-2 of a memory device that includes regions 430-8, ..., 430-15 of a memory device.

In a number of embodiments, flag 424 can include two bits, bits 426-0 and 426-1. When bit 426-0 is set to logical value 0 and bit 426-1 is set to logical value 0, flag 424 can indicate data in a corresponding cache entry is in portion 434-1 of a memory device that includes regions 430-0, ..., 430-3 of a memory device. When bit 426-0 is set to logical value 0 and bit 426-1 is set to logical value 1, flag 424 can indicate data in a corresponding cache entry is in portion 434-2 of a memory device that includes regions 430-4, ..., 430-7 of a memory device. When bit 426-0 is set to logical value 1 and bit 426-1 is set to logical value 0, flag 424 can indicate data in a corresponding cache entry is in portion 434-3 of a memory device that includes regions 430-8, ..., 430-11 of a memory device. When bit 426-0 is set to logical value 1 and bit 426-1 is set to logical value 1, flag 424 can indicate data in a corresponding cache entry is in portion 434-4 of a memory device that includes regions 430-12, ..., 430-15 of a memory device.

In a number of embodiments, flag 424 can include three bits, bits 426-0, 426-1, and 426-3. When bit 426-0 is set to logical value 0, bit 426-1 is set to logical value 0, and bit 426-2 is set to logical value 0, flag 424 can indicate data in a corresponding cache entry is in portion 436-1 of a memory device that includes regions 430-0, ..., 430-1 of a memory device. When bit 426-0 is set to logical value 0, bit 426-1 is set to logical value 0, and bit 426-2 is set to logical value 1, flag 424 can indicate data in a corresponding cache entry is in portion 436-2 of a memory device that includes regions 430-2, ..., 430-3 of a memory device. When bit 426-0 is set to logical value 0, bit 426-1 is set to logical value 1, and bit 426-2 is set to logical value 0, flag 424 can indicate data in a corresponding cache entry is in portion 436-3 of a memory device that includes regions 430-4, ..., 430-5 of a memory device. When bit 426-0 is set to logical value 0, bit 426-1 is set to logical value 1, and bit 426-2 is set to logical value 1, flag 424 can indicate data in a corresponding cache entry is in portion 436-4 of a memory device that includes regions 430-6, ..., 430-7 of a memory device. When bit 426-0 is set to logical value 0, bit 426-1 is set to logical value 0, and bit 426-2 is set to logical value 0, flag 424 can indicate data in a corresponding cache entry is in portion 436-5 of a memory device that includes regions 430-8, ..., 430-9 of a memory device. When bit 426-0 is set to logical value 1, bit 426-1 is set to logical value 0, and bit 426-2 is set to logical value 1, flag 424 can indicate data in a corresponding cache entry is in portion 436-6 of a memory device that includes regions 430-10, ..., 430-11 of a memory device. When bit 426-0 is set to logical value 1, bit 426-1 is set to logical value 1, and bit 426-2 is set to logical value 0, flag 424 can indicate data in a corresponding cache entry is in portion 436-7 of a memory device that includes regions 430-12, ..., 430-13 of a memory device. When bit 426-0 is set to logical value 1, bit 426-1 is set to logical value 1, and bit 426-2 is set to logical value 1, flag 424 can indicate data in a corresponding cache entry is in portion 436-8 of a memory device that includes regions 430-14, ..., 430-15 of a memory device.

In a number of embodiments, flag 424 can include four bits, bits 426-0, 426-1, 426-3, and 426-4. When bit 426-0 is set to logical value 0, bit 426-1 is set to logical value 0, bit 426-2 is set to logical value 0, and bit 426-3 is set to logical value 0, flag 424 can indicate data in a corresponding cache entry is in portion 438-1 of a memory device that includes region 430-0 of a memory device. When bit 426-0 is set to logical value 0, bit 426-1 is set to logical value 0, bit 426-2 is set to logical value 0, and bit 426-4 is set to logical value 1, flag 424 can indicate data in a corresponding cache entry is in portion 438-2 of a memory device that includes region 430-1 of a memory device. When bit 426-0 is set to logical value 0, bit 426-1 is set to logical value 0, bit 426-2 is set to logical value 1, and bit 426-4 is set to logical value 0, flag 424 can indicate data in a corresponding cache entry is in portion 438-3 of a memory device that includes region 430-2 of a memory device. When bit 426-0 is set to logical value 0, bit 426-1 is set to logical value 0, bit 426-2 is set to logical value 1, and bit 426-4 is set to logical value 1, flag 424 can indicate data in a corresponding cache entry is in portion 438-4 of a memory device that includes region 430-3 of a memory device. When bit 426-0 is set to logical value 0, bit 426-1 is set to logical value 1, bit 426-2 is set to logical value 0, and bit 426-4 is set to logical value 0, flag 424 can indicate data in a corresponding cache entry is in portion 438-5 of a memory device that includes region 430-4 of a memory device. When bit 426-0 is set to logical value 0, bit 426-1 is set to logical value 1, bit 426-2 is set to logical value 0, and bit 426-4 is set to logical value 1, flag 424 can indicate data in a corresponding cache entry is in portion 438-6 of a memory device that includes region 430-5 of a memory device. When bit 426-0 is set to logical value 0, bit 426-1 is set to logical value 1, bit 426-2 is set to logical value 1, and bit 426-4 is set to logical value 0, flag 424 can indicate data in a corresponding cache entry is in portion 438-7 of a memory device that includes region 430-6 of a memory device. When bit 426-0 is set to logical value 0, bit 426-1 is set to logical value 1, bit 426-2 is set to logical value 1, and bit 426-4 is set to logical value 1, flag 424 can indicate data in a corresponding cache entry is in portion 438-8 of a memory device that includes region 430-7 of a memory device. When bit 426-0 is set to logical value 0, bit 426-1 is set to logical value 0, bit 426-2 is set to logical value 0, and bit 426-4 is set to logical value 0, flag 424 can indicate data in a corresponding cache entry is in portion 438-9 of a memory device that includes region 430-8 of a memory device. When bit 426-0 is set to logical value 1, bit 426-1 is set to logical value 0, bit 426-2 is set to logical value 0, and bit 426-4 is set to logical value 1, flag 424 can indicate data in a corresponding cache entry is in portion 438-10 of a memory device that includes region 430-9 of a memory device. When bit 426-0 is set to logical value 1, bit 426-1 is set to logical value 0, bit 426-2 is set to logical value 1, and bit 426-4 is set to logical value 0, flag 424 can indicate data in a corresponding cache entry is in portion 438-11 of a memory device that includes region 430-10 of a memory device. When bit 426-0 is set to logical value 1, bit 426-1 is set to logical value 0, bit 426-2 is set to logical value 1, and bit 426-4 is set to logical value 1, flag 424 can indicate data in a corresponding cache entry is in portion 438-12 of a memory device that includes region 430-11 of a memory device. When bit 426-0 is set to logical value 1, bit 426-1 is set to logical value 1, bit 426-2 is set to logical value 0, and bit 426-4 is set to logical value 0, flag 424 can indicate data in a corresponding cache entry is in portion 438-13 of a memory device that includes region 430-12 of a memory device. When bit 426-0 is set to logical value 1, bit 426-1 is set to logical value 1, bit 426-2 is set to logical value 0, and bit 426-4 is set to logical value 1, flag 424 can indicate data in a corresponding cache entry is in portion 438-14 of a memory device that includes region 430-13 of a memory device. When bit 426-0 is set to logical value 1, bit 426-1 is set to logical value 1, bit 426-2 is set to logical value 1, and bit 426-4 is set to logical value 0, flag 424 can indicate data in a corresponding cache entry is in portion 438-15 of a memory device that includes region 430-14 of a memory device. When bit 426-0 is set to logical value 1, bit 426-1 is set to logical value 1, bit 426-2 is set to logical value 1, and bit 426-4 is set to logical value 1, flag 424 can indicate data in a corresponding cache entry is in portion 438-16 of a memory device that includes region 430-15 of a memory device.

In FIG. 5, flag 524 can be on a filter on a cache controller and correspond to an entry (e.g., cache line) of a cache. Flag 524 can be used to determine if data associated with a request may be in cache or if it is not in cache. In FIG. 5, flag 524 can include bits 526-0, ..., 526-15. In a number of embodiments, flag 524 can include any number of bits. Bits 526-0, ..., 526-15 can correspond to a portion of a memory device where data in a corresponding cache entry is stored in a memory device. The cache controller can determine if data associated with a request may be located in a corresponding cache entry by comparing the address information in the request to the bits in the flag. If there is a match between the address information in the request and the bits in the flag, the cache controller can check the cache to determine if the data associated with the request is in the cache. If there is not a match between the address information in the request and the bits in the flag, the cache controller can locate and/or retrieve the data associated with the request from a memory device.

In FIG. 5, a memory device includes 16 regions, regions 530-0, ..., 530-15 and each of the bits 526-0, ..., 526-15 can correspond to a particular region. Bit 526-0 can correspond to region 530-0, bit 526-1 can correspond to region 530-1, bit 526-2 can correspond to region 530-2, bit 526-3 can correspond to region 530-3, bit 526-4 can correspond to region 530-4, bit 526-5 can correspond to region 530-5, bit 526-6 can correspond to region 530-6, bit 526-7 can correspond to region 530-7, bit 526-8 can correspond to region 530-8, bit 526-9 can correspond to region 530-9, bit 526-10 can correspond to region 530-10, bit 526-11 can correspond to region 530-11, bit 526-12 can correspond to region 530-12, bit 526-13 can correspond to region 530-13, bit 526-14 can correspond to region 530-14, and bit 526-15 can correspond to region 530-15. Bits 526-0, ..., 526-15 can be set to logical values 1 or 0. A bit set to logical value 1 indicates data in a corresponding cache entry is located in the region of the memory device corresponding to the bit. A bit set to logical value 0 indicates data in a corresponding cache entry is not located in the region of the memory device corresponding to the bit.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a cache; and
   a memory device coupled to the cache, wherein a cache controller is configured to:
      query the cache to determine whether data, corresponding to a request for data, is located in the cache in response to a determination that a number of bits of the request correspond to a plurality of cache entries in the cache, wherein the number of bits identify a portion of the memory device where data corresponding to the request is located in the memory device and wherein the data is stored within in the portion of the memory device identified by the number of bits and data from the portion of the memory device identified by the number of bits is also located in the plurality of cache entries in the cache.

2. The apparatus of claim 1, wherein the memory device is a non-volatile memory device and the cache is a DRAM memory device.

3. The apparatus of claim 1, wherein the cache is configured to store a portion of the data that is stored in the memory device.

4. The apparatus of claim 1, wherein each of the number of bits indicate a particular portion of the memory device where data corresponding to the request is located.

5. The apparatus of claim 1, wherein the number of bits indicate whether the cache is storing valid data corresponding to the request.

6. The apparatus of claim 1, wherein the number of bits identify at least a partial location of data corresponding to the request in the memory device.

7. The apparatus of claim 1, wherein the cache is configured to locate data in the cache corresponding to the request in response to the number of bits indicating the data corresponding to the request is in the cache.

8. The apparatus of claim 1, wherein the cache controller is configured to locate data in the memory device corresponding to the request in response to the number of bits indicating the data corresponding to the request is not in the cache.

9. An apparatus, comprising:
   a controller; and
   a memory device and a cache coupled to the controller, wherein the controller is configured to:
      receive a number of requests for data;
      determine whether data corresponding to the number of requests for data is located in the cache based a number of address bits in the number of requests matching a number of bits that identify a location of data stored in the memory device of a number of corresponding cache entries; and
      in response to a determination that the number of bits that identify the location of data stored in the memory device of the number of corresponding cache entries match the number of address bits in the number of requests, query the cache to determine whether the data corresponding to the number of requests for data is located in the cache, wherein the data is stored within in a portion of the memory device identified by the number of bits and data from the portion of the memory device identified by the number of bits is also located in the number of corresponding cache entries.

10. The apparatus of claim 9, wherein each of the number of requests for data include an indication of a location in the memory device where the data corresponding to a particular request is located.

11. The apparatus of claim 9, wherein the number of bits include an entry for each cache entry of the cache.

12. The apparatus of claim 9, wherein the number of bits identify a portion of the memory device that corresponds to the data stored in a particular cache entry.

13. The apparatus of claim 9, wherein the controller is configured to determine whether the cache is accessed to locate data corresponding to the number of requests for data based on the number of bits and information in the number of request.

14. A method, comprising:
   receiving a request for data;
   determining that data associated with the request may be located in a cache based upon address bits in the request matching at least a portion of a number of bits associated with cache entries;
   querying the cache to determine whether the data corresponding to the request for data is located in the cache in response to a determination that the address bits in the request matches at least the portion of the number of bits associated with cache entries; and
   determining that data associated with the request is not located in the cache based upon the address bits in the request not matching at least the portion of the number of bits associated with the cache entries.

15. The method of claim 14, wherein determining that data associated with the request may be located in the cache includes matching a portion of address information associated with the request with the number of bits associated with the cache entries.

16. The method of claim 14, wherein determining that data associated with the request is not located in the cache includes matching a portion of address information associated with the request with the number of bits associated with the cache entries.

17. The method of claim 14, further including searching for the data associated with the request in the cache in response to determining that data associated with the request may be located in the cache.

18. The method of claim 14, wherein determining that data associated with the request is not located in the cache includes locating an indication in the number of bits associated with the cache entries that a cache entry associated with the request is invalid.

19. The method of claim 14, wherein determining that data associated with the request may be located in the cache includes matching a portion of address information associated with the request with the number of bits associated with the cache entries that identifies a portion of the cache where data associated with the request may be located.

20. The method of claim 14, further including locating the number of bits associated with the cache entries based on the information in the request.

\* \* \* \* \*